US009226246B2

(12) United States Patent
Hassett

(10) Patent No.: US 9,226,246 B2
(45) Date of Patent: Dec. 29, 2015

(54) CONTROL OF TRANSMITTER CONFIGURATION FOR BASE STATION

(75) Inventor: Brendan Hassett, Loughrea (IE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 131 days.

(21) Appl. No.: 14/131,670

(22) PCT Filed: Jul. 8, 2011

(86) PCT No.: PCT/EP2011/061615
§ 371 (c)(1),
(2), (4) Date: Apr. 11, 2014

(87) PCT Pub. No.: WO2013/007276
PCT Pub. Date: Jan. 17, 2013

(65) Prior Publication Data
US 2014/0221037 A1  Aug. 7, 2014

(51) Int. Cl.
*H04W 52/00* (2009.01)
*H04W 52/38* (2009.01)
(Continued)

(52) U.S. Cl.
CPC ............. *H04W 52/38* (2013.01); *H04B 17/309* (2015.01); *H04W 52/245* (2013.01); *H04W 52/325* (2013.01); *H04B 17/318* (2015.01); *H04B 17/327* (2015.01); *H04W 52/143* (2013.01)

(58) Field of Classification Search
CPC .............................. H04B 17/318; H04W 52/38
USPC ............. 455/522, 67.11, 452.2, 462, 442, 69, 455/422.1
See application file for complete search history.

(56) References Cited

U.S. PATENT DOCUMENTS 5,201,066 A * 4/1993 Kim .............................. 455/411
2001/0033600 A1 10/2001 Yang et al.
(Continued)

FOREIGN PATENT DOCUMENTS

WO    9917576 A1    4/1999
WO    2007076882 A1    7/2007

OTHER PUBLICATIONS

3rd Generation Partnership Project; Technical Specification Group Services and System Aspects; Telecommunication management; Subscriber and equipment trace; Trace concepts and requirements (Release 11), 3GPP TS 32.421 V11.6.0, 2013, 38 pages.
(Continued)

*Primary Examiner* — John J Lee
(74) *Attorney, Agent, or Firm* — Rothwell, Figg, Ernst & Manbeck, P.C.

(57) ABSTRACT

Adjusting transmitter configuration for a base station transmitter of a cell of a wireless network, involves receiving indications of received power measured at user equipments (UE) of customers over a first period of time of service operation of the cell, determining a generic change in the received power over a second period of time at chosen ones of the user equipments in an area, chosen to represent reference points within the area, and chosen based on variability in the received power. Then an adjustment is made to the transmitter configuration based on the determined generic change in the received power. Selecting which UEs to use can enable detection of finer gradations in the generic changes in the received power to be distinguished from the larger changes in individual indications of the received power. This can lead to better control of the transmitter configuration under changing conditions.

21 Claims, 11 Drawing Sheets

(51) Int. Cl.
   *H04W 52/24*  (2009.01)
   *H04W 52/32*  (2009.01)
   *H04B 17/309*  (2015.01)
   *H04W 52/14*  (2009.01)
   *H04B 17/318*  (2015.01)
   *H04B 17/327*  (2015.01)

(56) References Cited

U.S. PATENT DOCUMENTS

2005/0143090 A1    6/2005   Dowling
2007/0270155 A1   11/2007   Nelson, Jr. et al.
2010/0081469 A1*   4/2010   Kazmi et al. .................. 455/522
2010/0103868 A1    4/2010   Meng et al.
2011/0319088 A1*  12/2011   Zhou et al. .................... 455/442

OTHER PUBLICATIONS

3rd Generation Partnership Project; Technical Specification Group Services and System Aspects; Telecommunication management; Subscriber and equipment trace; Trace concepts and requirements (Release 10), 3GPP TS 32.421 V10.2.0, 2011, 34 pages.

International Search Report and the Written Opinion of the International Searching Authority dated Jun. 18, 2012, in International Application No. PCT/EP2011/061615, 21 pages. (previously submitted on Jan. 8, 2014).

* cited by examiner

CONTROL OF TRANSMITTER CONFIGURATION FOR BASE STATION

CROSS REFERENCE TO RELATED APPLICATION(S)

This application is a 35 U.S.C. §371 National Phase Entry Application from PCT/EP2011/061615, filed Jul. 8, 2011, designating the United States, the disclosure of which is incorporated herein in its entirety by reference.

FIELD

The present invention relates to methods of adjusting transmitter configuration for a base station of a cell of a mobile cellular communications network, to methods of monitoring received power of transmissions from a base station, to apparatus for adjusting transmitter configuration for a base station of a cell of a mobile cellular communications network and to corresponding computer programs.

BACKGROUND

A cellular communications network has multiple radio transmitters, each broadcasting to a limited region (a cell). The power and frequencies of each radio transmitter or transmitters for a cell must be carefully chosen; if the power is too low, the cells will not overlap causing areas without adequate signal, and if the signal is too strong, there will be interference between cells.

The common practice is to configure the network so that the power is slightly above the desired level. This margin for error allows for the fact that the signal range may be reduced by atmospheric conditions, but is wasteful of power and increases the interference between cells. After configuring the transmitters to follow a coverage plan for each of the cells of the network, the actual coverage of the cells must be measured to check that the received signal power is according to expectations.

The traditional solution is for the network operator to perform "drive tests". In this traditional solution, dedicated measuring equipment is placed in vehicles which are driven to the most important locations. The results are processed off-line, by comparison to the coverage plan, and adjustments are determined manually for a given cell. A more automated solution is "UE based network performance measurement" where the network collects data about received power level from customer handsets active in the cell. This is much more efficient than drive testing but is much less precise—even after many measurements are taken and averaged. It is able to detect only major changes such as complete loss of power at a transmitter.

SUMMARY

Embodiments of the invention provide improved methods and apparatus. According to a first aspect of the invention there is provided a method of adjusting a transmitter configuration for a base station transmitter of a cell of a wireless communications network. The method comprises receiving indications of received power of a wireless signal measured at user equipments over a first period of time and determining a generic change in the received power at user equipments in an area of interest over a second period of time. The generic change in the received power is determined from the indications of the received power at chosen ones of the user equipments in the area of interest, wherein the user equipments are chosen to represent reference points within the area of interest based on variability of the received power. The method also comprises causing an adjustment to be made of the transmitter configuration based on the determined generic change in the received power.

Another aspect provides a corresponding computer program for carrying out such method.

Another aspect provides an apparatus for configuration of a base station transmitter of a cell of a wireless communications network. The apparatus comprises an input for receiving indications of received power of a wireless signal measured at user equipments over a first period of time. The apparatus further comprises a processor for determining a generic change in the received power for the area of interest over a second period of time from the indications of the received power at chosen ones of the user equipments. The user equipments are chosen to represent reference points within the area of interest based on variability of the received power. The apparatus has a controller for determining an adjustment to be made to the transmitter configuration based on the determined generic change in the received power and an output for outputting an adjustment signal to the base station transmitter to cause the adjustment to be made.

Another aspect provides a transmitter configuration system for configuration of a base station transmitter of a cell of a wireless communications network, the system having a base station and a network management element.

The base station is arranged to obtain indications of received power of a wireless signal measured at user equipments over a first period of time and to pass the indications of the received power to the network management element. The network management element has an apparatus as set out above to determine a generic change in the received power at user equipments over a second period of time. The generic change in the received power is determined from the indications of the received power at chosen ones of the user equipments in the area of interest. The user equipments are chosen to represent reference points within the area of interest based on variability of the received power. The network management element is also adapted to determine an adjustment to be made to the transmitter configuration based on the determined generic change in the received power and to send a signal to the base station to cause the base station to carry out the adjustment of the transmitter configuration.

Another aspect provides a method of monitoring power of a wireless signal received at user equipments from a base station transmitter of a cell of a wireless communications network. The method comprises receiving indications of received power of the wireless signal measured at user equipments over a first period of time. The method also comprises determining a generic change in the received power for the area of interest over a second period of time from these indications. The indications are of the received power at chosen ones of the user equipments in the area, wherein the user equipments are chosen to represent reference points within the area of interest based on variability of the received power. The determined generic changes over different periods of time are recorded.

Further features of the present invention are as claimed in the dependent claims.

Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the description is illustrative only and is not intended to limit the scope of the present invention.

BRIEF DESCRIPTION OF THE DRAWINGS

How the present invention may be put into effect will now be described by way of example with reference to the appended drawings illustrating embodiments of the invention, in which.

DETAILED DESCRIPTION

Figure 1:
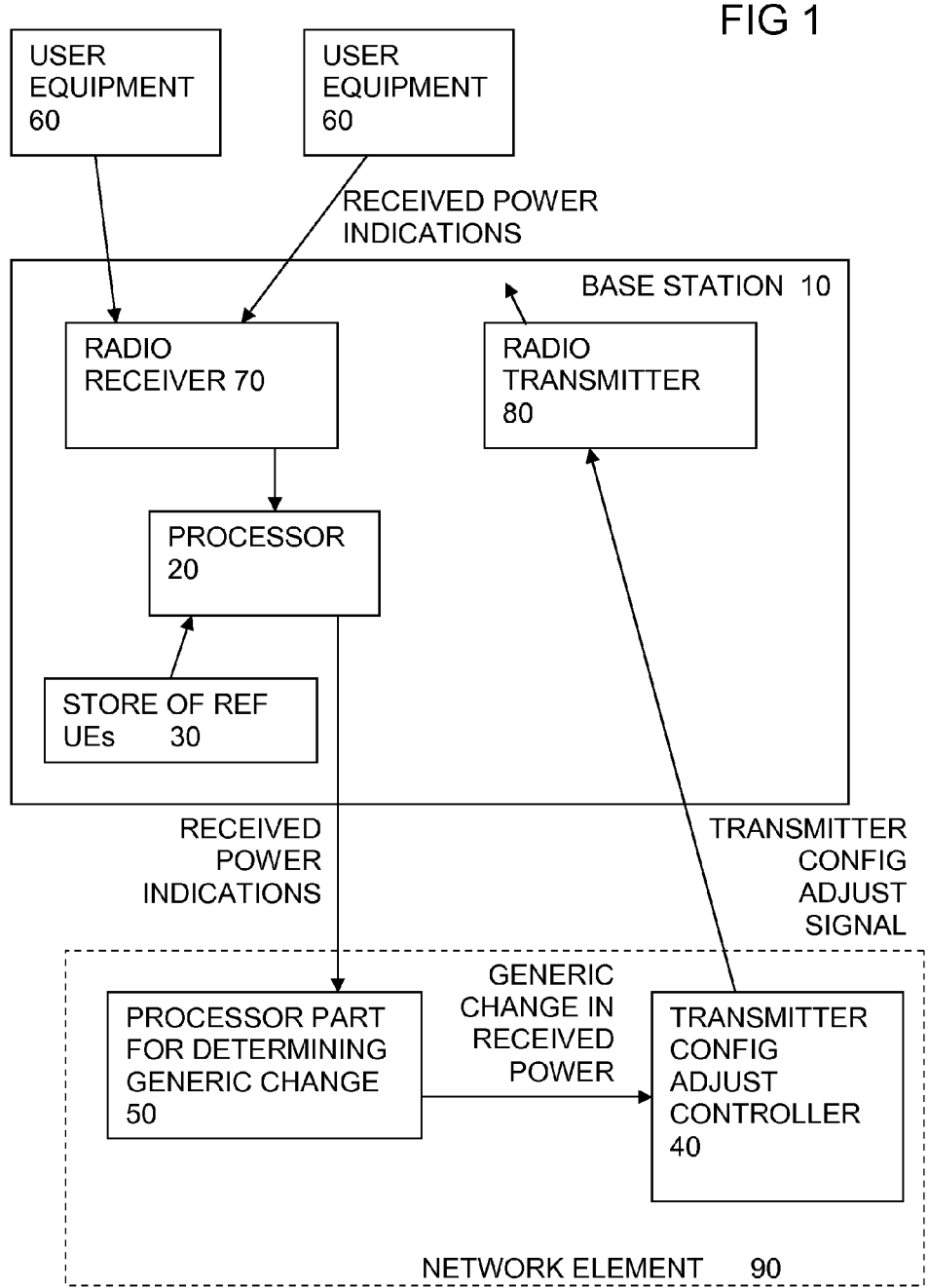
FIG. 1 shows a schematic view of apparatus of part of a network having a base station according to one embodiment.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes.

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described base stations, nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of switching node, not limited to the types described, not limited to any level of integration, or size or bandwidth or bit rate and so on.

References to base stations are intended to encompass any kind of base station, not limited to those of any particular wireless protocol or frequency, and not limited to being located at a single location and so can encompass distributed base stations having functions at different locations or shared functions in a computing cloud shared between multiple base stations.

References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

References to transmitter configuration are intended to encompass any type of configuration which affects the power or frequency received by the user equipments.

References to indications of received power can encompass any type of indication, direct or indirect, coded or uncoded, processed or raw, and so on.

The term generic change in the received power used in this document refers to a change in the received power level that is of a more or less global character in the cell served by a particular base station transmitter. A generic change in the received power can be caused by a fault or deterioration of transmitting equipment, changing atmospheric conditions, change of urban landscape, etc. It may be that a generic change affects part of the cell, e.g. a new building or an accidental tilt of an antenna of a transmitter serving this cell.

The term variability of the received power used in this document refers to changes of the power of the signal received at the UE (User Equipment) which are specific to individual user equipment (e.g. user equipment moving in an unpredictable way) or a group of co-located user equipments (e.g. user equipments of users waiting at a bust stop are temporarily shielded by a bus). These changes are usually rapid and/or short-living and/or repetitive.

By way of introduction to the embodiments, how they address some issues with conventional designs will be explained. Current techniques do not provide data which is reliable enough for use for real-time control of cell transmission power.

The cell power measurements may be collected from handsets, but these handsets may be moving, causing unpredictable variation in the measurements which swamp the smaller generic changes (e.g. caused by atmospheric conditions) in power across a cell or part of a cell. The resulting measurements are useful to detect major deviations from the planned power level, but are too unpredictable to detect changes caused for example by atmospheric conditions.

To address this it is proposed to identify which UEs can be used as reference points without their individual variations in received power swamping the small generic changes in the received power. This can be because their movements are small or rare, or non-existent, or regular and predictable for example. Even if there are not many of these as a proportion of mobile users, there may be enough in the busiest cells where accurate transmission power level is most important.

As the number of mobile subscriptions exceed the number of humans, it is likely that many future cellular devices will be static (non-moving) equipment, for example vending machines or electricity/gas meters. This static equipment may be the most suitable for use as reference points within the network. Because this equipment does not move, the equipment should experience an unchanging level of received signal power (apart from small changes caused by movements of objects or people nearby for example). Any change in received signal power (especially if experienced by several static equipments in the cell) will indicate a cell-wide change in received signal power.

Figure 4:
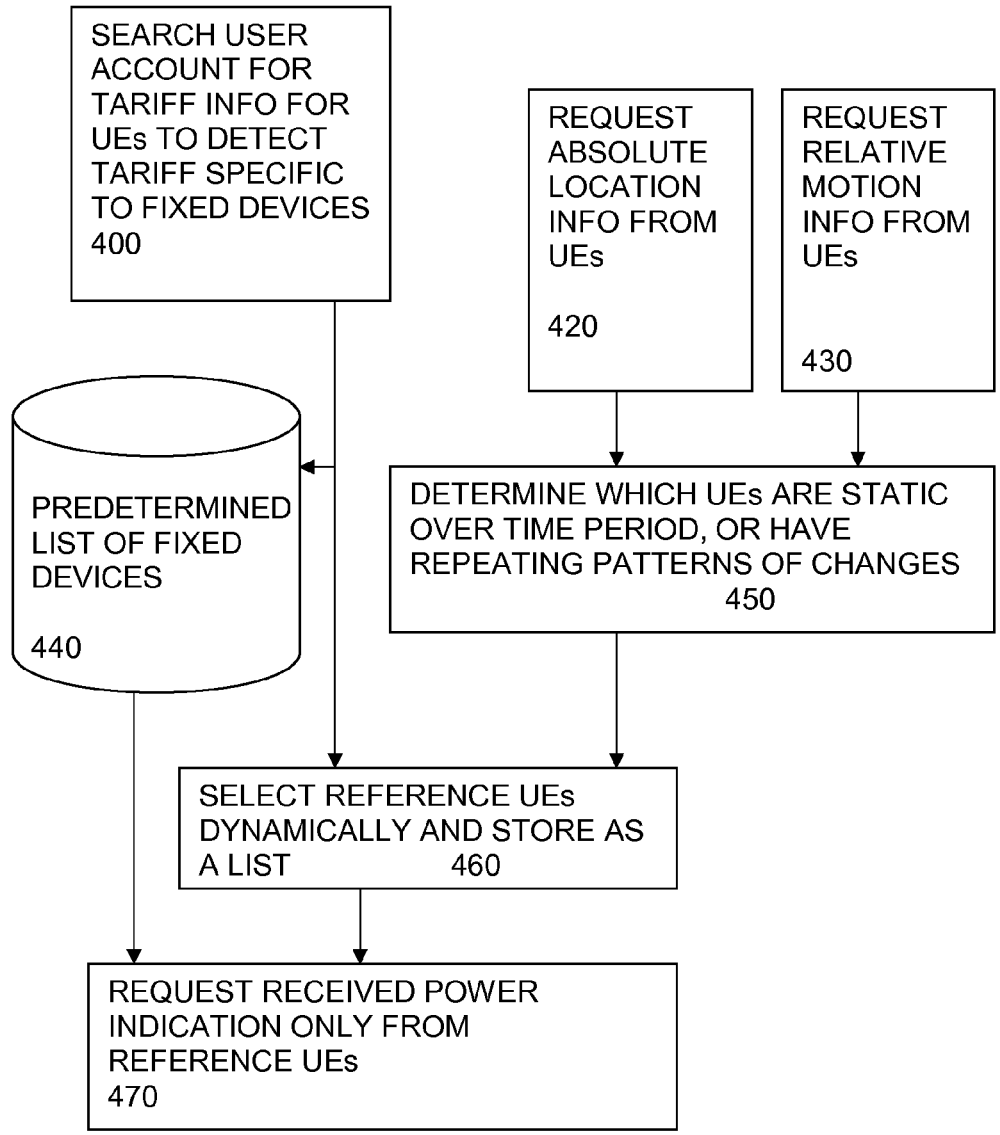
FIG. 4 shows various options for steps in selecting which UEs to use as reference UEs, according to different embodiments.

This requires automatically or manually identifying the static or other reference user equipments in the network either dynamically or as a one off preliminary step. This can be done in various ways some of which are shown in FIG. 4 described below. Then, in operation, there is a step of measuring the variation in cell signal power reported by the selected reference (e.g. static) user equipments. Based on these selected measurements, a generic change in received power can be obtained without being swamped by individual variations. From this it is now feasible to determine an adjustment of the transmitter configuration to control the cell transmission power level or power distribution in spatial or frequency terms, for example, to counteract this generic change in the received power if it is not planned or intended.

Figure 2:
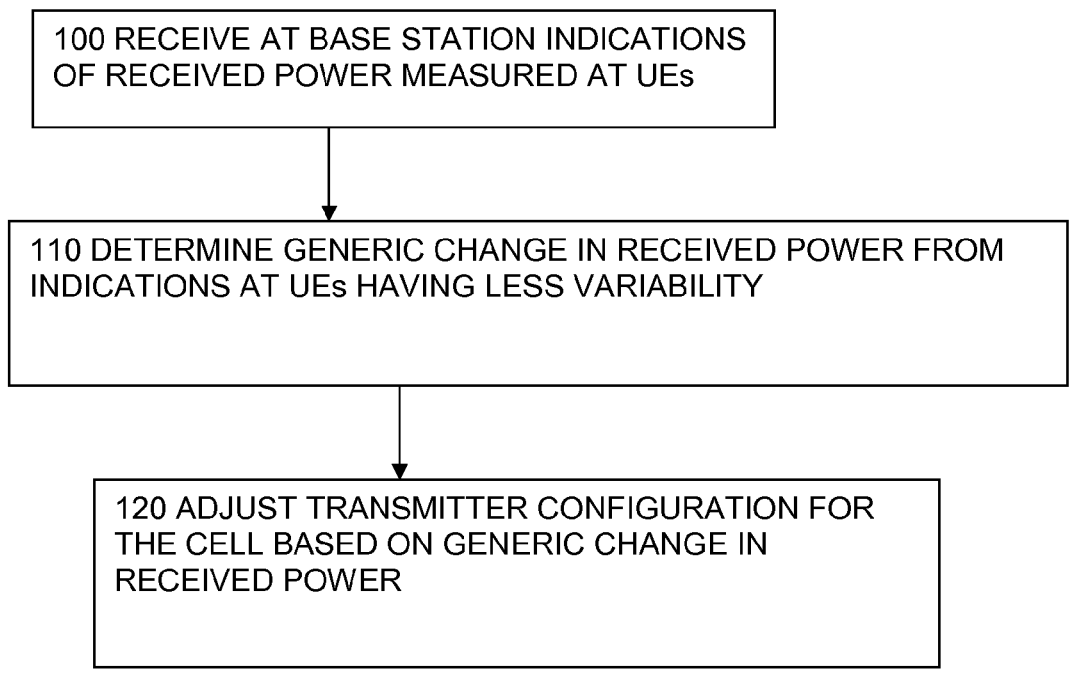
FIG. 2 shows steps of a method according to one embodiment.

Such transmitter power control by selective use of static UEs (or those for which the motion effects can be predicted and cancelled out) as reference points has a number of effects. As shown in FIGS. 1 and 2, selecting which indications to use can enable finer gradations in generic changes in the received power over an area to be distinguished from the larger changes in individual indications of the received power. This can lead to better control of the transmitter configuration under changing conditions over an area of part or all of the cell, such as changing atmospheric conditions or transmitter deterioration or faults for example.

This can lead to more efficient trade-off between transmitter power and interference with other cells for example, by reducing margins allowed for changing cell-wide conditions for example. It can in some cases enable planned changes in power to be monitored and controlled more accurately. In some cases it can also enable intra cell differences in power changes to be detected and compensated or accentuated by suitable adjustments of the transmitter configuration.

In some, but not all cases, the step of determining the generic change in the received power is based on indications of received power level from selected user equipments which are static over a period of time. As will be seen by reference to FIG. 3 described in more detail below, such static user equipments are more likely to have smaller variability in the received power and thus generic changes show up more clearly. User equipment can be regarded as static if it is temporarily static, or permanently fixed. User equipment can be regarded as static even if small amounts of movement occur during at least part of the time period.

In some cases, the step of determining which of the user equipments are relatively static is based on a predetermined list indicating which user equipments are fixed devices. As will be seen by reference to FIG. 4 described in more detail below, this can be easier to implement than trying to detect which User Equipments are fixed.

In various embodiments of the invention user equipments being the reference points are selected based on the variability of the received power at the user equipments and, as discussed above, in the case of user equipments that have low variability of the of the received power the generic changes show up more clearly. For this reason the user equipments having low variability of the received power are preferred as reference points.

In one embodiment a user equipment having the lowest variability of the received power in a defined sample area is selected as the reference point. When the cell or other area of interest is divided into a plurality of such sample areas then in each sample area one user equipment having the lowest variability of the received power is selected as a reference point (with the exception of a sample area with no user equipment in it). An advantage of this embodiment is that the area of interest is very well represented which allows for determining geographical distribution of the generic change in received power.

In an alternative embodiment a threshold is defined for the variability of the received power and only those user equipments that experiencing variability of the received signal not greater than the threshold are used as the reference points. An advantage of this embodiment is improved accuracy of determining the generic change in the received power, which can be achieved by setting the threshold very low so that only permanently fixed user equipments are selected as reference points. If the number of user equipments with variability of the received power below the threshold is large then the threshold can be lowered and in this way accuracy of determining the generic change will be improved even further.

In yet another alternative embodiment a combination of the sample areas and threshold for the variability of the received signal is used. In this embodiment, in a sample area only those user equipments are chosen as reference points that have variability of the received signal below the defined threshold.

In the following description terms "low variability of the received signal" and "less variability of the received signal" refer to variability of the received signal used to select reference points in the context discussed above, so that the variability of the received signal is at a level such that the generic changes are not lost in individual variations.

There can be a step of selecting which of the user equipments have less variability in their received power based on information sent from the user equipments. As will be seen by reference to FIG. 4 described in more detail below, this can enable more control over the selection and can include user equipments which are temporarily static. This may be useful, for example, if there are insufficient number of permanently static devices and can help avoid the need for any additional hardware.

There can be a step of choosing which of the user equipments have less variability in the received power after compensating for predictable variations. This enables components of the measurements from, for example, repeating patterns of motion or interference, to be removed to leave underlying generic changes. There can be a step of using information sent from the user equipment about position, such as absolute position, or about motion at different times for determining if the respective user equipment is static or has a repeating pattern of motion, for use in choosing which of the user equipments have less variability in the received power. As will be seen by reference to FIG. 4, described in more detail below, this can help to enable the discovery simply and unambiguously of which of the user equipments are static or are suitable for use as reference points using conventional capabilities without needing additional equipment.

The step of determining the generic change can comprise determining a distribution of changes over time of the received power and determining the generic change based on the distribution. This can be used in various ways to help determine the generic change.

The step of determining the generic change can comprise determining a modal value or an average value of changes in the received power at the different ones of the selected user equipments. As will be seen by reference to FIG. 6 described in more detail below these are particularly convenient ways to deduce the generic change from the raw information available, others can be envisaged.

The step of determining the generic change in the received power can comprise determining a distribution of changes over time of the received power at the selected user equipments, and determining from the distribution whether there is a generic change in the received power. As will be seen by reference to FIG. 6 described in more detail below this is one way to implement the determining of the generic change, practically and efficiently.

The step of adjusting the transmitter configuration can be to compensate for the determined generic change in the received power. As will be seen by reference to FIG. 3 described in more detail below, this compensation can be useful to maintain the received power to a planned value, although adjustments other than compensation are possible, for example to monitor and accentuate a planned modification.

The adjusting of transmitter configuration can comprise adjusting any one or more of power, power distribution to different frequencies, antenna tilt, antenna azimuth, and pattern of coverage. As will be seen by reference to FIG. 3 described in more detail below, some or all of these are typically adjustable automatically at existing base stations without needing costly hardware modification.

The method can have the step of sending the indications from a base station of the cell to a network management element serving many cells, the step of determining the generic change in the received power being carried out by the network management element, followed by sending a signal from the element to the base station to cause the base station to carry out the adjustment of the transmitter configuration based on the determined generic change in the received power. As will be seen by reference to FIG. 3 described in more detail below, such centralisation of the determining of the generic change can enable implementation based on existing processing resources and protocols to reduce costs of implementation and maintain compatibility. Other possible implementations having the determination distributed out to the base stations or other locations can be envisaged.

The step of determining the generic change may involve determining the generic change for two or more areas of interest within the cell and adjusting the transmitter configuration based on the respective generic changes for the areas of interest. As will be seen by reference to FIG. 5 described in more detail below, this can help enable more detailed monitoring, to enable more flexible or finer control of coverage or to help reduce interference.

Some additional features of embodiments of the apparatus will now be discussed. The processor can be arranged to base the determining on indications of level of received power from selected user equipments which are static over the period of time. Such static user equipments are more likely to have smaller variations in their received power and thus generic changes show up more clearly. The processor can be arranged to determine which of the user equipments are static based on a predetermined list indicating which user equipments are permanently static because they are fixed devices.

In one embodiment the processor can be arranged to determine which of the user equipments are static based on information sent from the user equipments. This can enable more control over the selection and can include user equipments which are temporarily static. This is particularly useful if the number of permanently static devices is too small. This embodiment can help avoid the need for any additional hardware. The processor can be arranged to choose which of the user equipments have less variability in received power after compensating for predictable variations in the received power. This can help enable underlying generic changes to be detected more accurately. The processor can be arranged to determine the generic change in the received power by determining a distribution of changes over time of the received power, and determining, from the distribution, whether there is a generic change in the received power across the cell, to implement the determining of the generic change practically and efficiently.

The processor can be arranged to determine the adjustment of the transmitter configuration to compensate for the determined generic change in the received power, which is useful to maintain the received power to a planned value. The adjustment can comprise an adjustment in any one or more of power, power distribution to different frequencies, antenna tilt, antenna azimuth, and pattern of coverage, some of which are typically adjustable automatically at existing base stations without needing costly hardware alterations.

The apparatus can be arranged to determine the generic change for two or more areas of interest within the cell, and to adjust the transmitter configuration based on the respective generic changes for the areas of interest. The apparatus can be part of a base station or a radio network controller or a network management element.

FIG. 1, Part of a Network Having a Base Station According to First Embodiment,

FIG. 1 shows a schematic view of apparatus of part of a network having a base station according to a first embodiment. A base station 10 of a cellular network has a radio receiver 70, and a radio transmitter 80, which may be separate or integrated as a transceiver. They are capable of radio communication with user equipments 60, of which two are shown, though there can be many more of course. The cellular network can be of any type, using any frequency or modulation, well known examples are GSM, UMTS or LTE. For UMTS, the node B can be an example of the base station, while for LTE, the eNodeB can be an example of the base station. The radio receiver 70 in the base station 10 can be implemented according to conventional practice according to the type of network and base station, so no further details need to be provided here. The radio receiver 70 is coupled to pass received data to a base station processor 20, which can distinguish indications of received power in the data. A store 30 of reference UEs is coupled to the processor to enable the processor to select the indications only from the reference UEs, rather than from all the UEs. The selection can be made by sending requests only to the reference UEs, in which case the network management element could be arranged to select which of the UEs of a given cell to send the requests to.

The selected received power indications are processed by a processor 50 for determining the generic change in the received power level. From this value, a controller 40 is shown for generating a transmitter configuration adjust signal which is fed to the radio transmitter 80 in the base station to cause the reconfiguration. The processor 50 and controller 40 are shown as separate functions, located apart from the base station in any kind of network management element 90. These functions can of course be implemented in various ways, including as a single processor arranged to carry out both functions. One or both of these functions can be carried out at different locations, and some examples are described below with reference to FIGS. 7 to 10.

FIG. 2 Method Steps According to an Embodiment,

FIG. 2 shows steps of a method according to an embodiment. At step 100 indications of received power measured at UEs over a first period of time of service operation of the cell are received at the base station. This is either prompted by a request from the base station or network management system, or without a request if the protocols used by the UEs allow. The measurements can be made in various ways, and stored at any suitable location, to be made available for the determination of the generic change. One typical way is as an RSCP (Received Signal Code Power) measurement which can be requested and passed across the network as set out in the 3G standards at 3GPP Technical specification 32.421 "Telecommunications management, Subscriber and equipment trace; Trace concepts and requirements."

At step 110 the determination of the generic change in the received power over a second period of time in the cell or a smaller area of interest within the cell, is made from the indications of the received power from UEs selected as reference points. Then the adjustment of the transmitter configuration for the cell can be determined and made at step 120, based on the determined generic change in the received power over the cell or part of the cell. These steps can each be implemented in various ways, and other steps can of course be added.

In one embodiment the first and second periods of time are equal and the same and in alternative embodiment the second period of time is shorter than the first period of time and the second period of time is a section of the first period of time.

Figure 3:
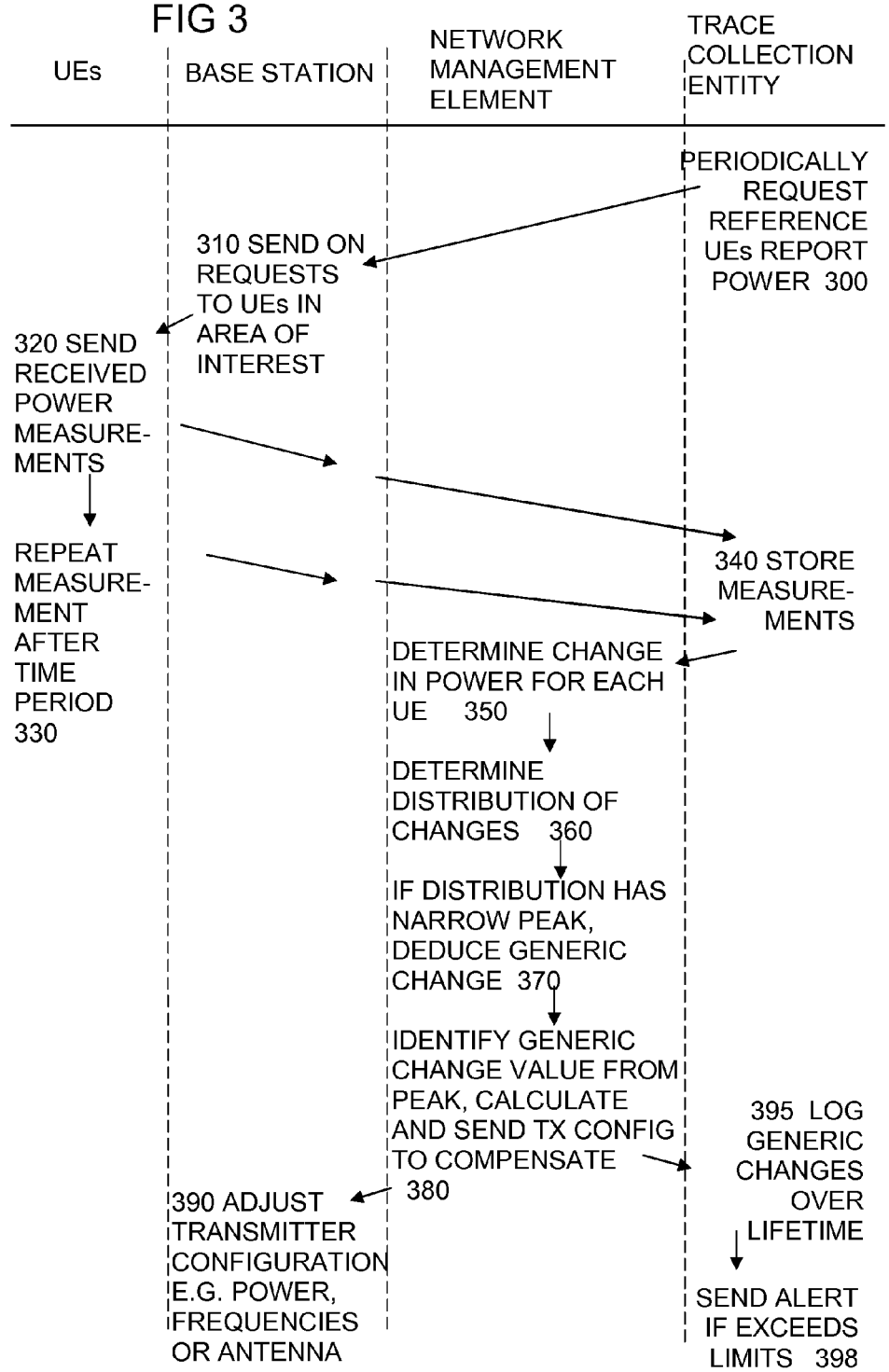
FIG. 3 shows a time chart for actions of various parts according to an embodiment, to determine a generic change and adjust the transmitter configuration to compensate for it.

FIG. 3, Time Chart for Actions of Various Parts According to an Embodiment

FIG. 3 shows a time chart for actions of various parts according to an embodiment of the present invention, to determine a generic change and adjust the transmitter configuration to compensate for it. Time flows down the page in this chart. A left column shows actions of UEs, a second column shows actions of a base station, a third column shows actions of a network management element for determining the generic change, and a right hand column shows actions of a trace collection entity, TCE. It is assumed for this figure that the selection of reference UEs has already been made by selecting suitable UEs having less variability in the received power. In principle, in other cases this selection could be made dynamically after all the UEs have sent in their measurements of the received power, though for large numbers of UEs this might use too much communication and processing capacity.

The TCE in this example periodically sends requests to reference UEs of a given cell, to report their received power at step 300. This can be implemented using the above mentioned TS32.421 specification. The user equipments can be identified by their IMEI (International Mobile Equipment Identity), or by the subscriber's IMSI (International Mobile Subscriber Identity). The TCE or the base station can maintain a database having a list of reference UEs for its cell, which may be updated from information obtained from the UEs themselves in various ways, as will be described in more detail with reference to FIG. 4. At step 310, the base station sends on the requests to UEs in the area of interest, covering either the entire cell or a part of it, such as heavily used areas such as a hospital, transport infrastructure and so on.

The UEs (or just the reference UEs) respond by performing measurements of received power and at step 320 sending in the measurements either periodically such as once per hour or once per day or any other suitable period. These are passed on by the base station to the TCE or any other suitable part of the network management system, which typically stores them as shown by step 340 in a database accessible by any element having a processor suitable for determining generic change. After a given time period, the received power measurements can be repeated at step 330 so as to enable the change in measurement for each UE to be determined by subtraction at step 350.

Optionally, these steps of timing the measurements and/or carrying out the subtraction to determine the change, could be carried out at the base station, and the differences could be passed to the network management element for determining the generic change. Then at step 360 this element determines a distribution of the changes for the selected reference UEs. This can be represented as a table or graph of size of change versus frequency of occurrence of that size. Typically there is a peak in the distribution near zero if there is little generic change. If there is a broad distribution, with a number of different sizes of change occurring frequently, it can be deduced that any generic change is not clearly distinguished from the individual variations in the received power. But if there is a peak in the distribution which is narrower than a given threshold, then it can be deduced at step 370 that there is a generic change in the received power which is distinguished from the individual variations sufficiently clearly. The value of the generic change is indicated by the size of change corresponding to the peak.

The same network management element or another element can then use the generic change information for controlling the transmitter configuration. This can involve selecting a suitable compensation amount based on this detected generic change, for sending at step 380 as a command to the base station. The compensation amount could be a proportion of an amount which would completely reverse the generic change, following established control algorithms. This might help avoid sudden oscillations in transmitted power levels. At the base station the command is received and acted on at step 390, to alter the transmitter configuration, for example to adjust transmitter power level, or frequencies or antenna orientation and so on. Optionally, the adjustment may be to implement a planned change in power level rather than to compensate for an unwanted change. A network planning tool may be used to coordinate such planned changes.

The TCE or other network element can be used at step 395 to log, for example, the received power values, the average or the modal value, or a summary of the distribution and/or generic changes over longer periods such as days, months or years for use in proving to regulatory authorities or to subscribers that given levels of service or regulatory limits on maximum or minimum received power were met. This can be carried out as an alternative to the use in adjusting the transmitter configuration or in addition to such adjustments. Another alternative or addition is to monitor the logged values to send at step 398 an immediate alert to a network administrator if an upper or lower limit is exceeded.

FIG. 4, Options for Steps in Selecting Which UEs to Use

FIG. 4 shows various options for steps in selecting which UEs to use as reference UEs, according to different embodiments. One way of finding UEs with low variability in the received power is to repeatedly request the received power measurements and compare the variability in the measurements over time at different UEs. But this is likely to be inefficient if most of the UEs move often. It may be more efficient to try to find which are static, either temporarily, or permanently if they are in fixed devices. In one case a predetermined list of fixed devices 440 can be provided. This can be for example generated from a database "UE measurements" which can be as defined in 3GPP specification 32.421 V10.2.0 (Use case #4 Checking Radio Coverage). This database can be regularly updated. The database "UE measurements" is queried to find UEs which are not mobile, as shown by the step 460 of selecting reference UEs. This may be done by, for example (but not limited to):

If the UEs report their geographical position, search for UEs which have an unchanged position for a selected time period (example 1 week)

Search for UEs which have remained camped on the same cell for a selected time period (example 1 week)

For the UEs which are not mobile, the reported cell identities and RSCP measurements can be copied to generate a list in the form of a new database to be known as the "Filtered UE measurements".

Other sources are also shown, which may be alternatives or may be combined. The steps shown may be carried out at various locations, such as a network management element (which can be an OAM processor or any other centralized entity), or at the base station in principle. At step 400 a request is made to search a user account which may be held by a billing system or other account management system, to request tariff information for UEs to see if any UE has a tariff specific to fixed devices or any other information which indicates a fixed device. At step 420 a request is made to the UEs to return absolute location information such as GPS based location information from the UEs. At step 430 relative motion information can be requested if there is a motion sensor in the UE, such as an accelerometer. This information from steps 420 and 430 is used by step 450 to determine which UEs are static or have repeating patterns of motion, by determining motion over a period of time. The amount of motion or the amount of unpredictable motion may be compared to a threshold to select dynamically which of the UEs have least motion and therefore should have least variability in the received power, to use as reference UEs at step 460. This can be stored as a list. Optionally, the list can be updated by determining actual values of variability of the received power of some or all of the UEs and modifying the list to drop those with most variability and to include others with less variability. Other criteria for inclusion in the list can be used in addition, such as geographical location, so that the list includes UEs spread across all parts of the area of interest.

Once the reference UEs are determined, then at step 470 requests can be sent to each of the reference UEs for them to report their received power, or the list can be used to select which data to use if the received power has been measured non selectively. Then the generic change can be determined in various ways as shown in FIG. 2 or 3 for example. In some embodiments, for each cell identity in the database "Filtered UE measurements", the reported RSCP measurements for this cell can be averaged for all static UEs. If the averaged reported RSCP level has deviated from a reference level, control signals are sent to the cell to adjust the cell transmission power, to correct the deviation.

Figure 5:
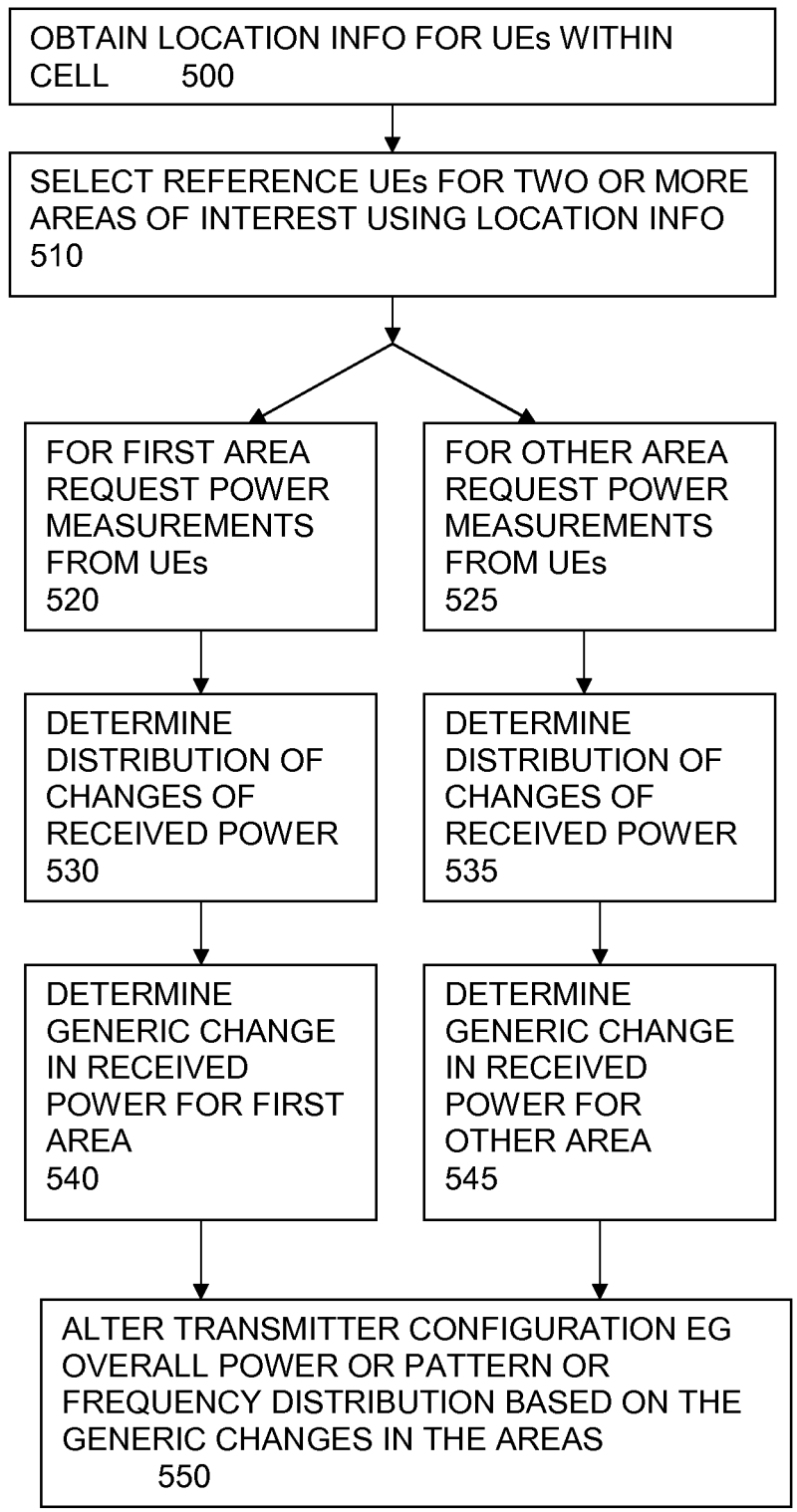
FIG. 5 shows steps according to another embodiment involving selecting reference UEs and determining generic changes for two or more areas of interest, to adjust the overall power or pattern of coverage based on the changes in the different areas of the cell.

FIG. 5, Steps for Determining Generic Changes for Two or More Areas

FIG. 5 shows steps according to another embodiment involving selecting reference UEs and determining generic changes for two or more areas of interest to adjust the overall power or pattern of coverage based on the changes in the different areas of the cell. At step 500, cell location info is obtained for UEs. Reference UEs are selected for two or more areas of interest using the location info at step 510. At step 520 for the first area, the received power measurements are requested from the UEs (or selected off line from a database of measurements). The same is done for another area at step 525. Then the generic change is determined for each of the areas. One example is as shown in step 530, where a distribution of changes of the received power is determined for the first area, and the same is done for the other area at step 535. At step 540 a generic change is determined for the first area from the distribution, which can involve steps shown in FIG. 6 described below. Again the same is done for the other area at step 545. Finally at step 550 the different generic changes for the different areas of the cell are used to determine a change in transmitter configuration. This can be for example a change in overall power level, or spatial pattern or frequency distribution.

Figure 6:
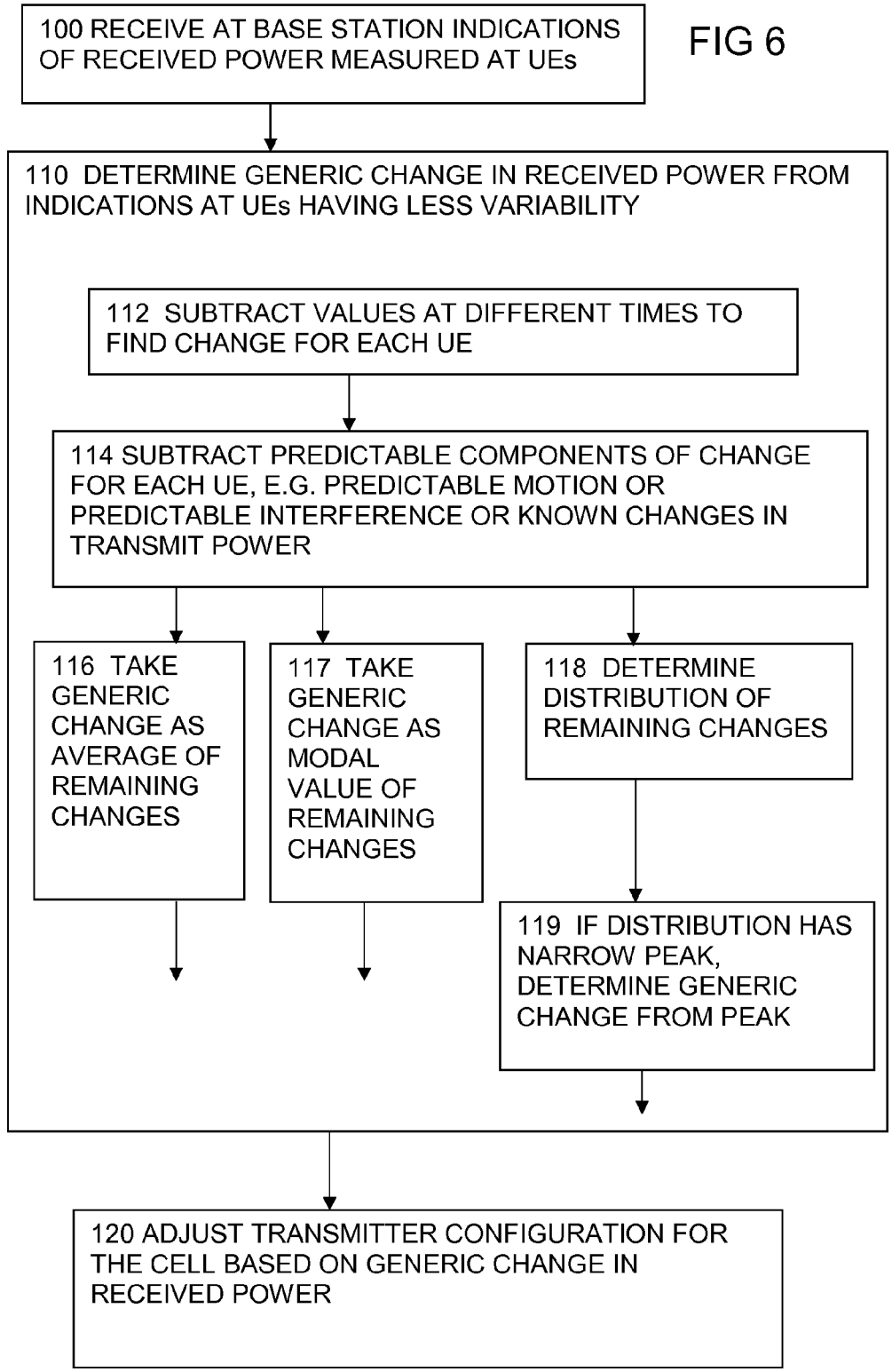
FIG. 6 shows steps in possible implementations of determining the generic change.

FIG. 6, Possible Implementations for Determining the Generic Change

FIG. 6 shows steps similar to those of FIG. 2 and shows a number of options for implementing step 110 of determining the generic change. At step 112, there is a step of subtracting values of the received power at different times to find a change in the received power at each UE over the second period of time. At step 114, there is an optional step of compensating predictable components of the change values specific to each UE so that any generic change is represented more accurately by the remaining change for that UE. This can involve a further subtraction from the values determined at step 112. These predictable variations can be for example components of the measured changes attributable to known changes in transmitted power, predictable motion of the UE or predictable changes in interference over the second period of time, for example from weather changes, or predictable motion of objects near the UE.

Then three alternative ways of processing the remaining change values are shown at steps 116, 117, and the combination of steps 118 and 119. These three alternatives can optionally be carried out in parallel and results combined, for more accuracy. At step 116 the generic change is taken as the average of the remaining change values. At step 117, a modal value is taken as the generic change. At step 118, a distribution of the remaining changes is determined, then at step 119, if the distribution has a narrow enough peak, compared to a threshold width, then it is deduced that there is a generic change rather than merely random remaining changes, and the change corresponding to the peak of the distribution is taken as the generic change. Then at step 120, the results of any or all of these three options, can be used as before, for adjusting the transmitter configuration.

FIGS. 7-10 Schematic Views of Various Embodiments

FIGS. 7-10 show schematic views of various embodiments where the parts for determining the generic change, and for determining an adjustment to be made based on the generic change, are located at different places.

Figure 7:
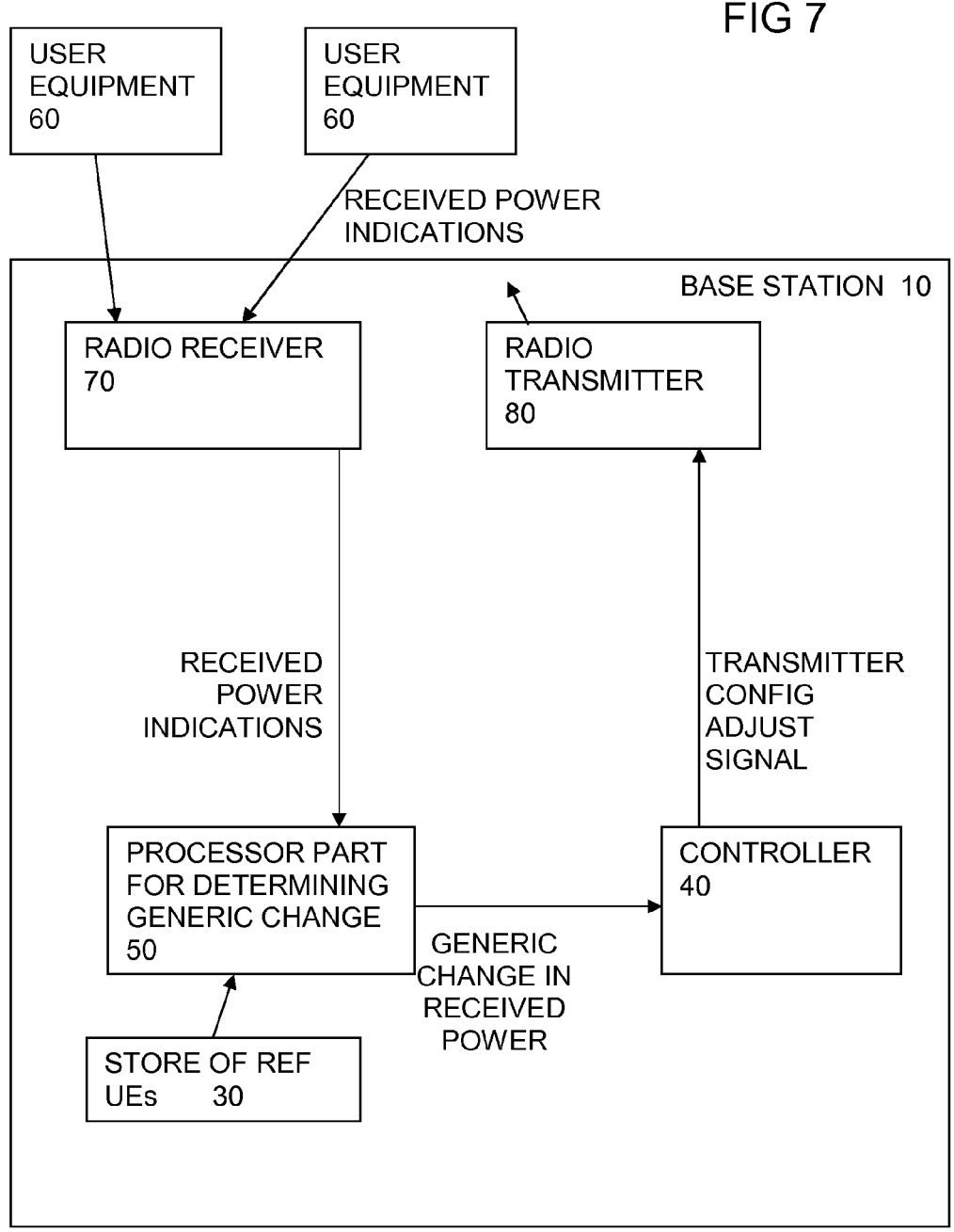
FIG. 7-10 show schematic views of various embodiments where the parts for determining the generic change, and for determining an adjustment to be made based on the generic change, are located at different places.
Figure 8:
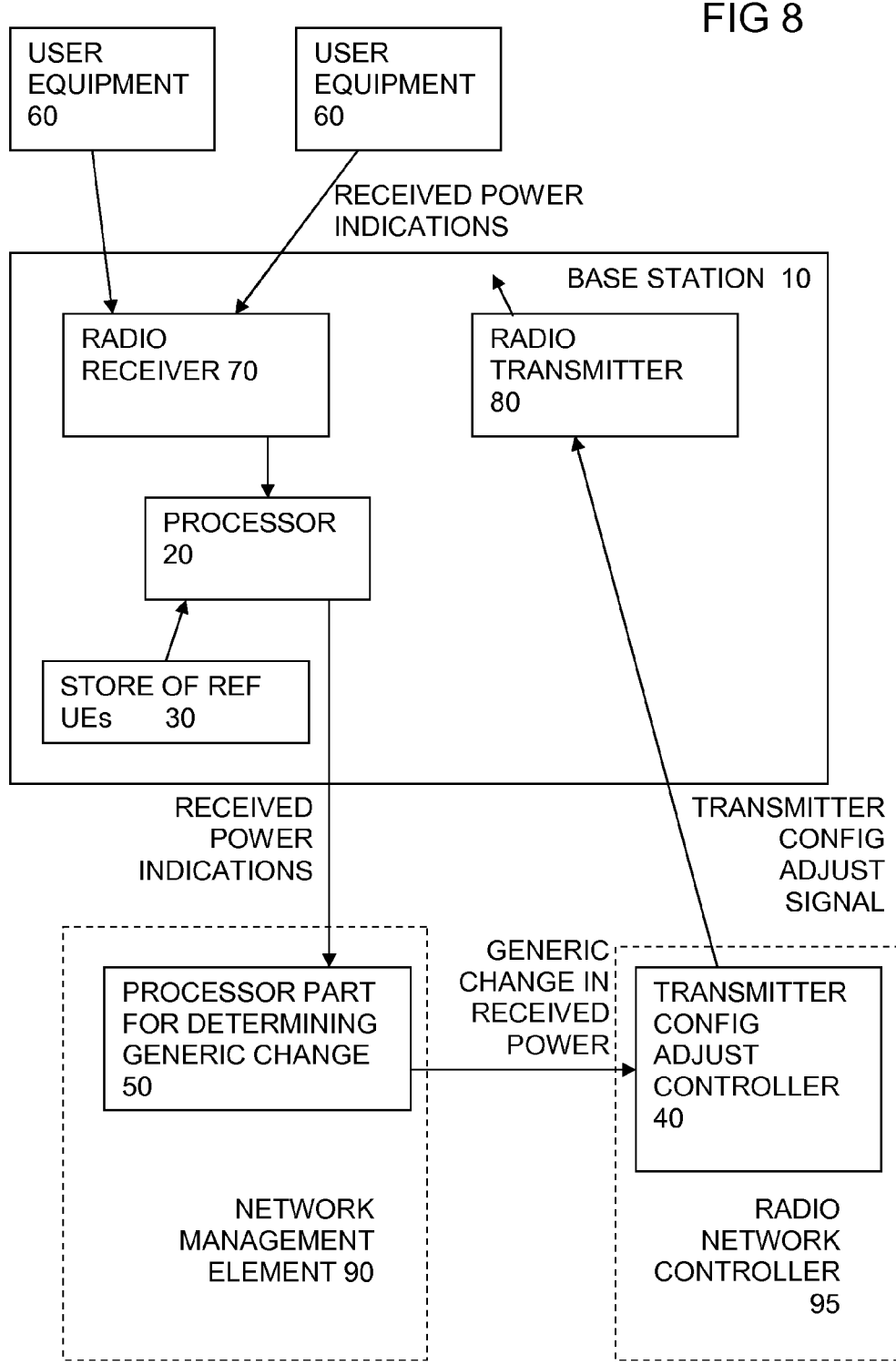
Figure 9:
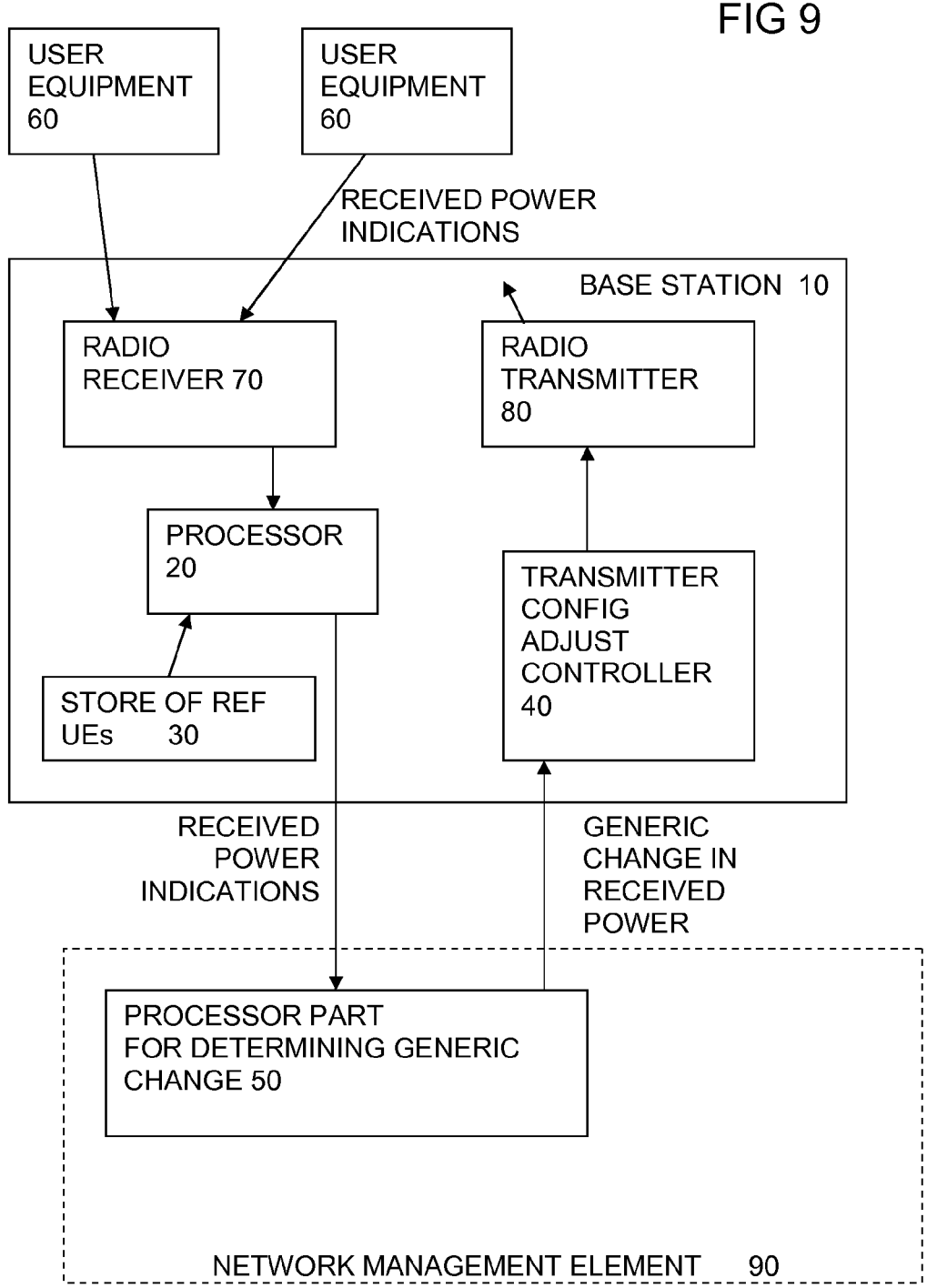
Figure 10:
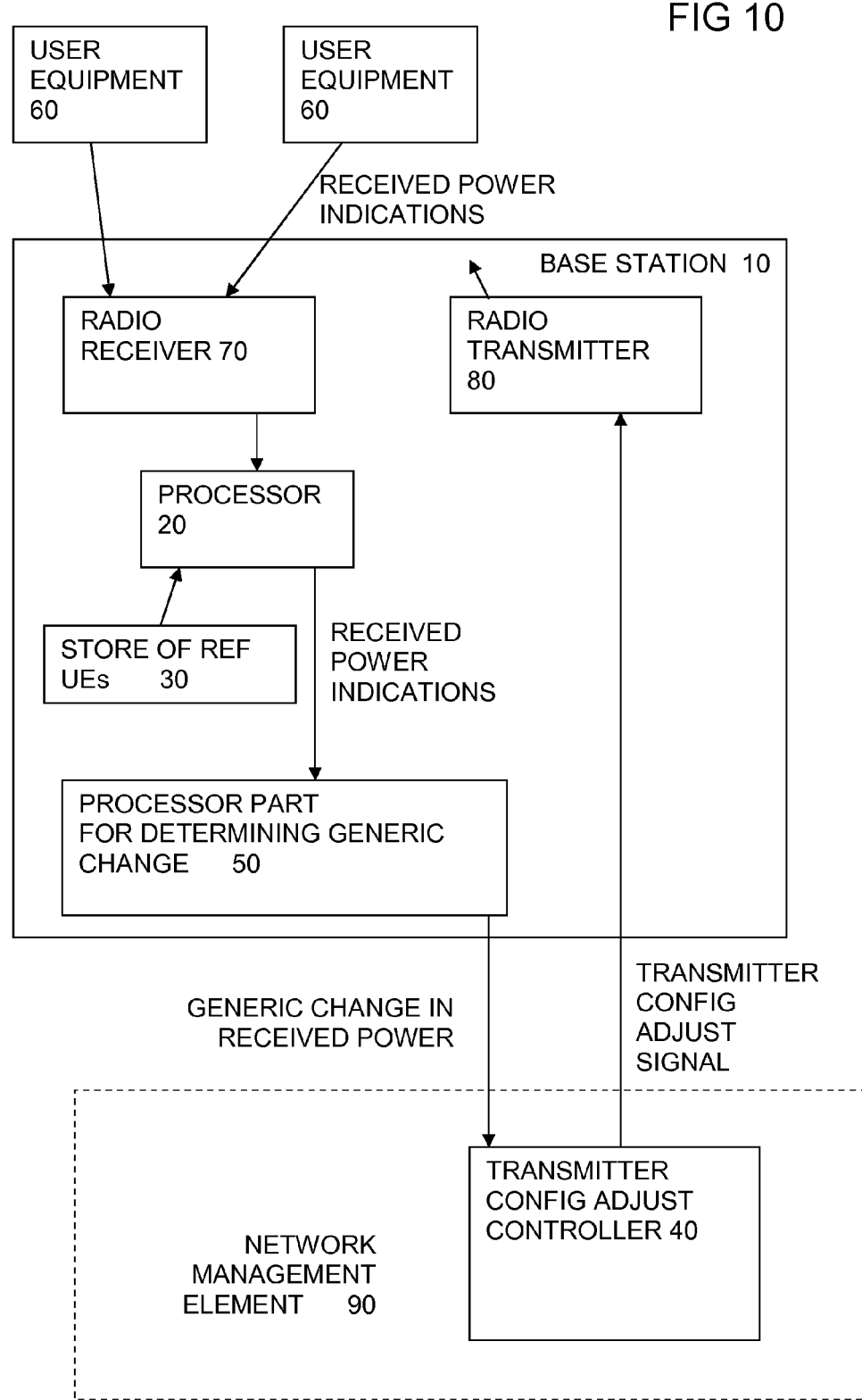

FIG. 7 shows an arrangement similar to FIG. 1, but having the generic change determination and the configuration control carried out in the base station. FIG. 8 shows an arrangement similar to FIG. 1, but having the generic change determination carried out externally in a network management element 90, and the configuration control carried out in a radio network controller 95 which may control multiple base station transmitters. FIG. 9 shows an arrangement similar to FIG. 8, but having the generic change determination carried out in a network management element 90 with the configuration controller 40 being located in the base station. Thus the base station 10 receives a signal showing the generic change in the received power, from the network management element. FIG. 10 shows an arrangement similar to FIG. 8, but having the generic change determination carried out locally at the base station and the generic change information is fed to the network management element 90 where the configuration control is carried out. Hence the base station in this case receives a signal indicating a transmitter configuration adjustment.

Figure 11:
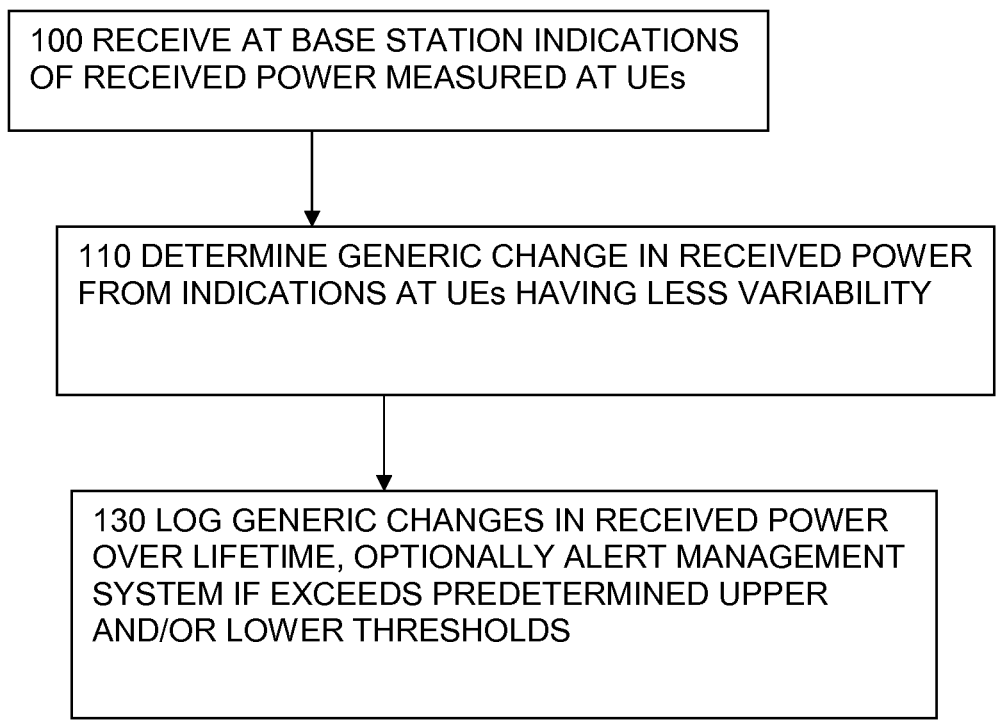
FIG. 11 shows steps of a method of monitoring according to an alternative embodiment.

FIG. 11, Using Generic Change for Monitoring

FIG. 11 shows steps of a method of monitoring according to an embodiment without necessarily using the results for adjusting transmitter configuration. As in FIG. 2, at step 100 indications of the received power measured at UEs are received at the base station, either prompted by a request from the base station or network management system, or without a request if the protocols used by the UEs allow. The measurements can be made in various ways, and stored at any suitable location, to be made available for the determination of the generic change. At step 110 the determination of the generic change in the received power over the cell or smaller area of interest within the cell, is made from the indications of the received power from selected UEs selected as reference points. Then at step 130, rather than reconfiguring the transmitter, the generic changes and other relevant values such as received power measurements or averages of such measurements, are logged for other uses. Such uses include reporting if maximum or minimum limits for received power are exceeded based on the determined generic changes, or if differences between different areas of the cell exceed given limits to enable a network administrator to take action. Another use for logging over a longer time period is to provide proof of transmitter performance over a wide area. This may be useful in case subscribers or regulatory authorities dispute the level of service or need verification of operation within contract or regulatory requirements.

Various embodiments allow real-time control of cell transmission power by using only measurements from selected UEs which are suitable as references. This may be those which are static within the network. By identifying UEs which are static, much of the variance in the measurements is removed and any resulting variation in measurements is likely to represent a generic change more accurately. By having accurate measurements of the received power the cell transmission power can be automatically controlled with better accuracy. This means that less of a margin for error is needed and the cells can transmit at lower power. This can reduce power consumption and interference between cells.

Other variations and embodiments can be envisaged within the claims.

REFERENCES

3GPP Technical Specification 32.421 V10.2.0 (2011-03) "Telecommunication management; Subscriber and equipment trace; Trace concepts and requirements"

The invention claimed is:

1. A method of adjusting a transmitter configuration of a base station transmitter of a cell of a wireless communications network, the method comprising:
receiving indications of received power of a wireless signal measured at user equipment over a first period of time;
determining a generic change in the received power at the user equipment in an area of interest over a second period of time from the indications of received power at chosen ones of the user equipment in the area of interest, wherein the user equipment are chosen to represent reference points within the area of interest based on variability of the received power; and
causing an adjustment to be made of the transmitter configuration based on the determined generic change in the received power.

2. The method of claim 1, wherein the step of determining the generic change in the received power is based on indications from user equipment which are static over the second period of time.

3. The method of claim 2, further comprising a step of determining which of the user equipment are static based on a predetermined list indicating which user equipment are fixed devices.

4. The method of claim 1, further comprising a step of determining the variability of the received power at the user equipment based on information received from the user equipment.

5. The method of claim 4, wherein the step of determining the variability in the received power at the user equipment uses one or more of information received from the user equipment about position and motion of said user equipment.

6. The method of claim 1, further comprising a step of determining the variability of the received power at the user equipment after compensating for predictable variations.

7. The method of claim 1, further comprising a step of determining a distribution of changes of the received power at the selected user equipment, and determining from a width of a peak in the distribution, whether there is a generic change in the received power.

8. The method of claim 1, further comprising a step of adjusting the transmitter configuration to compensate for the determined generic change in the received power.

9. The method of claim 1, wherein the adjusting comprises adjusting one or more of power level, power distribution to different frequencies, antenna tilt, antenna azimuth, and pattern of coverage.

10. The method of claim 1, further comprising a step of sending the indications from a base station of the cell to a network management element serving many cells, and wherein the step of determining the generic change in the received power is carried out by the network management element, and the method further comprising a step of sending a signal from the network management element to the base station to cause the base station to carry out the adjustment of the transmitter configuration based on the determined generic change in the received power.

11. The method of claim 1, wherein the step of determining the generic change in the received power comprises determining generic changes in the received power for two or more areas of interest within the cell, and adjusting the transmitter configuration based on the respective generic changes for the areas of interest.

12. A computer program on a non-transitory computer readable medium having instructions which, when executed by a computer, cause the computer to carry out the method of claim 1.

13. An apparatus for configuration of a base station transmitter of a cell of a wireless communications network, the apparatus comprising:
an input for receiving indications of received power of a wireless signal measured at user equipment over a first period of time;
a processor for determining a generic change in the received power at the user equipment in an area of interest over a second period of time from the indications of the received power at chosen ones of the user equipment in the area of interest, wherein the user equipment are chosen to represent reference points within the area of interest based on variability of the received power;
a controller for determining an adjustment to be made to ea transmitter configuration based on the determined generic change in the received power; and
an output for outputting an adjustment signal to the base station transmitter to cause the adjustment to be made.

14. The apparatus of claim 13, wherein the processor is configured to base the determining of the generic change in the received power on indications from selected user equipment which are static over the second period of time.

15. The apparatus of claim 14, wherein the processor is configured to determine which of the user equipment are static based on a predetermined list indicating which user equipment are fixed devices.

16. The apparatus of claim 14, wherein the processor is configured to determine the variability of the received power at the user equipment based on information received from the user equipment.

17. The apparatus of claim 13, wherein the processor is configured to determine the variability of the received power at the user equipment after compensating for predictable variations in the received power.

18. The apparatus of claim 13, wherein the processor is configured to determine a distribution of changes of the received power at the selected user equipment and to determine from a width of a peak in the distribution, whether there is a generic change in the received power.

19. The apparatus of claim 13, being a base station or a radio network controller or a network management element.

20. A transmitter configuration system for configuration of a base station transmitter of a cell of a wireless communications network, the transmitter configuration system comprising:
- a base station, and a network management element, and
- wherein the base station is configured to obtain indications of received power of a wireless signal measured at user equipment over a first period of time and to pass the indications of the received power to the network management element,
- the network management element having an apparatus comprising:
- an input for receiving indications of the received power of the wireless signal measured at user equipment over a first period of time;
- a processor for determining a generic change in the received power at the user equipment in an area of interest over a second period of time from the indications of the received power at chosen ones of the user equipment in the area of the interest, wherein the user equipment are chosen to represent reference points within the area of the interest based on variability of the received power;
- a controller for determining an adjustment to be made to the transmitter configuration based on the determined generic change in the received power; and
- an output for outputting an adjustment signal to the base station transmitter to cause the adjustment to be made;
- wherein the network management element is configured to determine the generic change in the received power at the user equipment in the area of the interest over the second period of time from the indications of the received power at chosen ones of the user equipment in the area of interest, wherein the user equipment are chosen to the represent reference points within the area of interest based on the variability of the received power, and the network management element is also adapted to determine the adjustment to be made to the transmitter configuration based on the determined generic change in the received power, and to send a signal to the base station to cause the base station to carry out the adjustment of the transmitter configuration.

21. A method of monitoring power of a wireless signal received at user equipment from a base station transmitter of a cell of a wireless communications network, the method comprising:
- receiving indications of received power of the wireless signal measured at the user equipment over a first period of time,
- determining a generic change in the received power for an area of interest over a second period of time from the indications of the received power at chosen ones of the user equipment in the area of interest, wherein the user equipment are chosen to represent reference points within the area of interest based on variability of the received power, and
- recording the determined generic changes in the received power.

* * * * *

UNITED STATES PATENT AND TRADEMARK OFFICE
CERTIFICATE OF CORRECTION

| | | |
|---|---|---|
| PATENT NO. | : 9,226,246 B2 | Page 1 of 1 |
| APPLICATION NO. | : 14/131670 | |
| DATED | : December 29, 2015 | |
| INVENTOR(S) | : Hassett | |

It is certified that error appears in the above-identified patent and that said Letters Patent is hereby corrected as shown below:

Drawings

In Fig. 1, Sheet 1 of 11, delete "FIG" and insert -- FIG. --, therefor at each occurrence throughout the figures.

Specification

In Column 3, Line 28, delete "FIG." and insert -- FIGS. --, therefor.

In Column 4, Line 34, delete "bust stop" and insert -- bus stop --, therefor.

In Column 8, Line 22, delete "Embodiment," and insert -- Embodiment --, therefor.

In Column 8, Line 59, delete "FIG. 2" and insert -- FIG. 2, --, therefor.

In Column 8, Line 59, delete "Embodiment," and insert -- Embodiment --, therefor.

In Column 12, Line 37, delete "FIGS. 7-10" and insert -- FIGS. 7-10, --, therefor.

Claims

In Column 14, Line 59, in Claim 13, delete "ea" and insert -- a --, therefor.

Signed and Sealed this
Tenth Day of May, 2016

Michelle K. Lee
*Director of the United States Patent and Trademark Office*